US008190605B2

(12) United States Patent
Kuhlke et al.

(10) Patent No.: US 8,190,605 B2
(45) Date of Patent: May 29, 2012

(54) PRESENTING ADDRESSABLE MEDIA STREAM WITH GEOGRAPHIC CONTEXT BASED ON OBTAINING GEOGRAPHIC METADATA

(75) Inventors: Matthew Kuhlke, San Francisco, CA (US); John Toebes, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 414 days.

(21) Appl. No.: 12/183,002

(22) Filed: Jul. 30, 2008

(65) Prior Publication Data

US 2010/0030806 A1 Feb. 4, 2010

(51) Int. Cl.
*G06F 17/30* (2006.01)

(52) U.S. Cl. .......................... 707/732; 707/919; 725/113

(58) Field of Classification Search ........................ None
See application file for complete search history.

(56) References Cited

U.S. PATENT DOCUMENTS

| 5,861,906 | A * | 1/1999 | Dunn et al. ...................... 725/87 |
| 6,714,215 | B1 * | 3/2004 | Flora et al. ...................... 715/716 |
| 6,715,126 | B1 * | 3/2004 | Chang et al. ................... 715/201 |
| 6,912,726 | B1 * | 6/2005 | Chen et al. ...................... 725/113 |
| 7,493,015 | B1 * | 2/2009 | Van Stam et al. .............. 386/343 |
| 2003/0215110 | A1 * | 11/2003 | Rhoads et al. ................. 382/100 |
| 2004/0221309 | A1 * | 11/2004 | Zaner et al. ...................... 725/46 |
| 2004/0237120 | A1 | 11/2004 | Lewin et al. |
| 2005/0028207 | A1 * | 2/2005 | Finseth et al. ................... 725/46 |
| 2007/0061832 | A1 * | 3/2007 | Kim et al. ......................... 725/14 |
| 2007/0106760 | A1 * | 5/2007 | Houh et al. .................... 709/219 |
| 2007/0115373 | A1 * | 5/2007 | Gallagher et al. .......... 348/231.3 |
| 2007/0204014 | A1 * | 8/2007 | Greer et al. .................... 709/219 |
| 2007/0245368 | A1 * | 10/2007 | Kawai .............................. 725/28 |
| 2007/0271297 | A1 * | 11/2007 | Jaffe et al. ................... 707/104.1 |
| 2008/0005699 | A1 * | 1/2008 | Dvorak et al. ................. 715/836 |
| 2008/0010605 | A1 * | 1/2008 | Frank ............................. 715/765 |
| 2008/0031600 | A1 * | 2/2008 | Robey ........................... 386/126 |
| 2008/0150963 | A1 * | 6/2008 | Stambaugh .................... 345/629 |
| 2008/0268876 | A1 * | 10/2008 | Gelfand et al. ............... 455/457 |
| 2009/0091578 | A1 * | 4/2009 | Carnahan et al. ............. 345/522 |
| 2009/0115862 | A1 * | 5/2009 | Andersson ................. 348/222.1 |
| 2009/0132941 | A1 * | 5/2009 | Pilskalns et al. .............. 715/764 |
| 2009/0143977 | A1 * | 6/2009 | Beletski et al. ............... 701/201 |
| 2009/0204899 | A1 * | 8/2009 | Bennett ......................... 715/730 |
| 2009/0216435 | A1 * | 8/2009 | Zheng et al. .................. 701/209 |
| 2009/0222482 | A1 * | 9/2009 | Klassen et al. ............. 707/104.1 |
| 2009/0254840 | A1 * | 10/2009 | Churchill et al. ............. 715/753 |
| 2009/0299990 | A1 * | 12/2009 | Setlur et al. ....................... 707/5 |

(Continued)

OTHER PUBLICATIONS

Leung et al., "Design of an interactive video-on-demand system," 2003 IEEE, Multimedia, IEEE Transactions on vol. 5, No. 1, Mar. 2003, pp. 130-140.*

(Continued)

*Primary Examiner* — Robert Timblin
*Assistant Examiner* — Richard Bowen
(74) *Attorney, Agent, or Firm* — Leon R. Turkevich

(57) ABSTRACT

In one embodiment, a method comprises identifying, by a device, an addressable video stream selected for viewing by a user of the device; obtaining, by the device, geographic metadata for the addressable video stream in response to the device identifying the addressable video stream, the geographic metadata including a location metadata element identifying a geographic location that describes a corresponding identifiable event within the addressable video stream; retrieving, by the device, location information about the geographic location based on the corresponding location metadata element; and displaying by the device the location information to the user, for presentation to the user of the location information that provides a geographic context for the identifiable event.

16 Claims, 6 Drawing Sheets

U.S. PATENT DOCUMENTS

2009/0312033 A1* 12/2009 Shen et al. ............... 455/456.1
2010/0002122 A1* 1/2010 Larson et al. ............ 348/333.01

OTHER PUBLICATIONS

U.S. Appl. No. 11/947,298, filed Nov. 29, 2007, Toebes et al.
U.S. Appl. No. 12/110,224, filed Apr. 25, 2008, Toebes et al.
U.S. Appl. No. 12/110,238, filed Apr. 25, 2008, Davi et al.
"Geospatial", [online], [retrieved on May 20, 2008]. Retrieved from the Internet: <URL:http://en.wikipedia.org/w/index.php?title=Geospatial&printable=yes>, pp. 1-3.
Google Earth Hacks, [online], [retrieved on Apr. 7, 2008]. Retrieved from the Internet: <URL:http://www.gearhhacks.com/dlcat42/TV-show/movie-locations.htm>, pp. 1-5.
"Interactive Movie", [online], [retrieved on Jul. 24, 2008]. Retrieved from the Internet: <URL:http://en.wikipedia.org/w/index.php?title=Interactive_movie&printable=yes>, pp. 1-4.
"Interactive television", [online], [retrieved on Jul. 24, 2008]. Retrieved from the Internet: <URL:http://en.wikipedia.org/w/index.php?title=Interactive_television&printable=yes>, pp. 1-8.
"Welcome to the MashupAwards", [online], [retrieved on Apr. 7, 2008]. Retrieved from the Internet: <URL:http://mashupawards.com>, pp. 1-2.
"VideoClix.tv", [online], [retrieved on Jul. 24, 2008]. Retrieved from the Internet: <URL:http://www.videoclix.tv/about>, pp. 1-2.
"Mashup (web application hybrid)", [online], [retrieved on Apr. 7, 2008]. Retrieved from the Internet: <URL:http://en.wikipedia.org/w/index.php?title=Mashup_%28web_application_hybrid%29&printable=yes>, pp. 1-6.
Toebes, "Enabling a Richer Video Experience With Metadata", W3C Video on the Web Workshop, Dec. 12-13, 2007, San Jose, California and Brussels, Belgium [online], [retrieved on Apr. 9, 2008]. Retrieved from the Internet: <URL:http://www.w3.org/2007/08/video/positions/Cisco_MSG.html>, pp. 1-4.

* cited by examiner

PRESENTING ADDRESSABLE MEDIA STREAM WITH GEOGRAPHIC CONTEXT BASED ON OBTAINING GEOGRAPHIC METADATA

TECHNICAL FIELD

The present disclosure generally relates to providing geographical information related to video content to users that consume the video content.

BACKGROUND

The convergence of telecommunications networks and Internet-based local and wide area networks has enabled users of these networks to enhance their experience of information that is consumed via these networks. A user can enhance his or her experience of observing an event that is presented during broadcast of an episode of a popular television series by interacting with services available via wide area networks such as the World Wide Web. For example, a website address for a social networking website can be displayed during a broadcast episode: the user can access a social networking website by manually entering the displayed website address into a web browser of a user computer. The user also can submit a comment to the social networking website regarding the broadcast episode, and/or view comments by other users of the social networking website regarding the broadcast episode. The comments submitted on the social networking website can include hyperlinks to maps, articles, and other fan websites related to the relevant television series.

Another example of a user enhancing his or her experience of an event presented in a broadcast episode of a television series involves accessing web-based data files that include geographical information relevant to the television series. For example, web sites such as "Google Earth Hacks" (available at the website address "www.gearthhacks.com") and "MashupAwards" (available at the website address "mashupawards.com") enable a user to download data files (referred to as "mashups") that can include geographical information identifying filming locations for various video content (e.g., films or television series) that has been broadcast to the user. Once a user has manually downloaded the data files into his or her personal computer, the data files can be interpreted by a geographical software executed by the user computer, for example Google Earth (available from Google at the website address "earth.google.com").

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
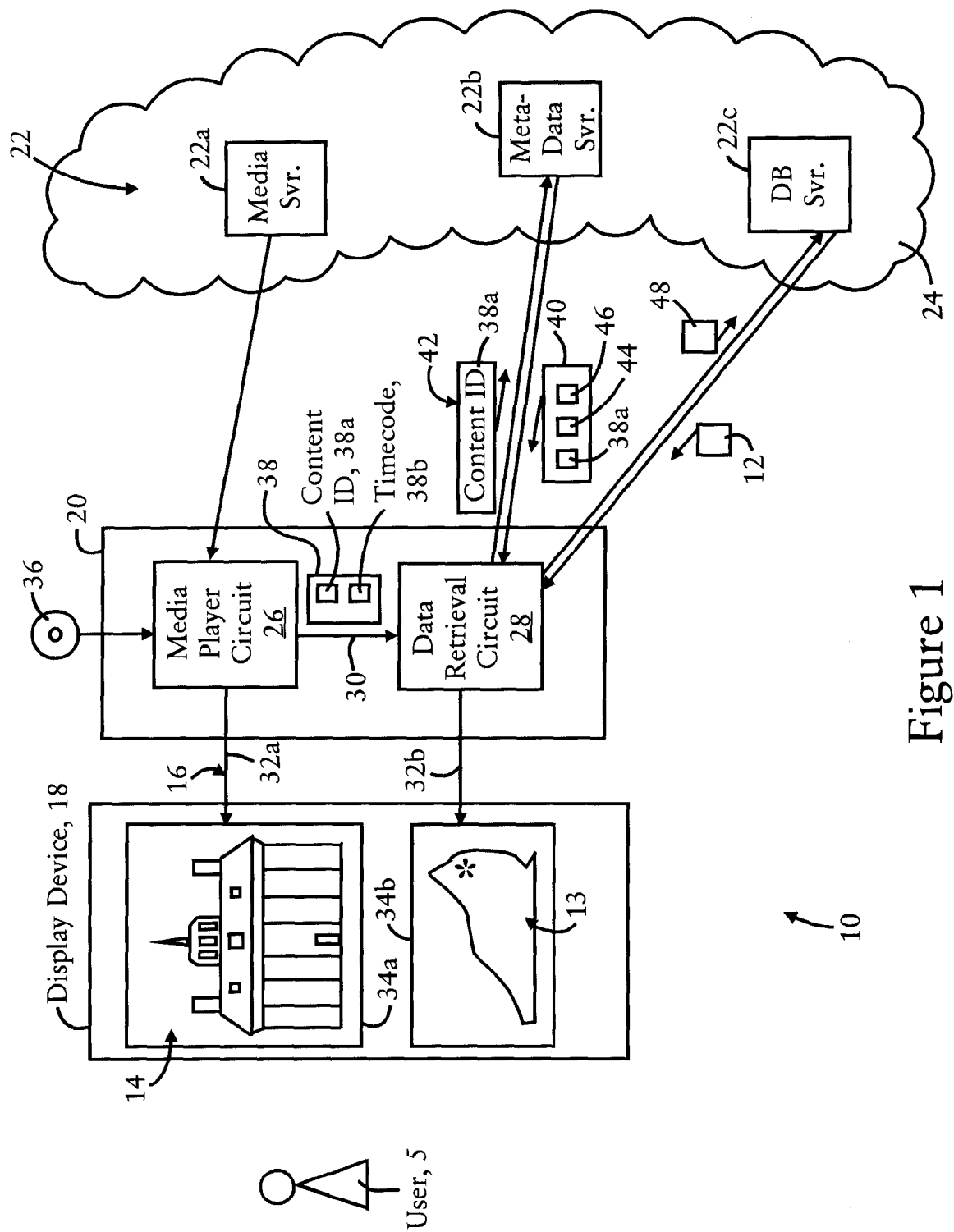
FIG. 1 illustrates an example system configured for retrieving and presenting location information that provides a geographic context for an event presented in an addressable video stream, according to an example embodiment.

In one embodiment, a method comprises identifying, by a device, an addressable video stream selected for viewing by a user of the device; obtaining, by the device, geographic metadata for the addressable video stream in response to the device identifying the addressable video stream, the geographic metadata including a location metadata element identifying a geographic location that describes a corresponding identifiable event within the addressable video stream; retrieving, by the device, location information about the geographic location based on the corresponding location metadata element; and displaying by the device the location information to the user, for presentation to the user of the location information that provides a geographic context for the identifiable event.

In another embodiment, an apparatus comprises a device interface circuit and a processor circuit. The device interface circuit is configured for detecting selection of an addressable video stream selected for viewing by a user of the apparatus. The processor circuit is configured for identifying the addressable video stream selected by the user. The processor circuit further is configured for obtaining geographic metadata for the addressable video stream in response to identifying the addressable video stream. The geographic metadata includes a location metadata element identifying a geographic location that describes a corresponding identifiable event within the addressable video stream. The processor circuit further is configured for retrieving location information about the geographic location based on the corresponding location metadata element. The processor circuit further is configured for causing the device interface circuit to display the location information to the user, for presentation to the user of the location information that provides a geographic context for the identifiable event.

DETAILED DESCRIPTION

Particular embodiments enable a user to enjoy a more enhanced experience of an identifiable event within an addressable video stream, based on presenting location information that provides a geographic context for an identifiable event presented by the addressable video stream in response to detecting that a user has selected the addressable video stream for viewing. Geographic metadata for the addressable video stream can be automatically obtained in response to identifying an addressable video stream that is selected for viewing by the user. The geographic metadata can include at least one location metadata element that identifies a geographic location describing an identifiable event within the addressable media stream. Location information about the geographic location can be retrieved for concurrent display to the user with the identifiable event within the addressable video stream. The geographic location describing the identifiable event can refer to any location depending on the context of the identifiable event or subject within the addressable video stream, including a geographic location where the identifiable event was recorded or filmed, a geographic location where a displayed article was manufactured, a geographic location illustrating where a real or fictional event occurred within the storyline presented by the addressable video stream, etc.

Hence, the presentation to the user of the retrieved location information provides a geographic context for the identifiable event within the addressable video stream, enabling the user to enjoy an enhanced experience with respect to the identifiable event presented to the user. The identifiable event also can be concurrently presented with the retrieved location information, enabling the user to view the identifiable event in the addressable video stream concurrently with the geographic context.

The display of location information also can be selectively aggregated across multiple events within the same addressable video stream or distinct addressable video streams based on determined relationships between the respective events, enabling a user to view "movement" within the geographic context of subjects presented in the sequence of events presented to the user. The aggregated location information also can be stored for later viewing after the user has viewed multiple events from one or more distinct addressable video streams. Hence, the user can view events from one or more addressable media streams, and later can enjoy the presentation of the geographic context of the viewed events in the form of a "mashup" of a persistent, dynamically-aggregated list of location information related to the events previously viewed by the user. Hence, the viewing of the location information can be distinct from the viewing of the respective events.

The location information that provides a geographic context for an identifiable event can be dynamic in nature, where the location information can be dynamically updated independent of the contents of the addressable video stream. Consequently, the location information can be based on information that is updated within a social networking website. Further, the nature of the location information about the geographic location describing the identifiable event can be variable based on prescribed selection criteria, for example known user preferences, user subscription information, etc.

The automatic retrieval of the geographic metadata and associated location information about the geographic location also enables the automatic presentation of a geographic context for any identifiable event within any addressable video stream that is selected by the user, even if the user is repeatedly switching to view a different addressable video stream, for example "channel surfing" through a range of broadcast video channels provided by a video service provider.

FIG. 1 is a diagram illustrating an example system 10 configured for retrieving and presenting location information 12 providing a geographic context 13 to a user 5 for an event 14 concurrently presented to the user 5 in an addressable video stream 16, according to an example embodiment. The system 10 includes a display device 18 and a video presentation device 20. The system can also can include remote servers 22 that can be reachable via a data network 24 such as a service provider network or the Internet.

The video presentation device 20 can include a media player circuit 26 and a data retrieval circuit 28. The media player circuit 26 and the data retrieval circuit 28 can be implemented as discrete consumer components that are connected via a data link (e.g., a Universal Serial Bus (USB) link or an Ethernet link) 30 and providing respective video outputs 32a and 32b to the display device 18. Hence, the video presentation device 20 can be regarded as a system having discrete components 26 and 28 that are interconnected via the data link 30, where the media player circuit 26 can be implemented as a consumer set-top box and the data retrieval circuit 28 can be implemented as a personal computer.

The video presentation device 20 also can be implemented as a single consumer device (e.g., a laptop computer or set-top box) that includes the media player circuit 26 and the data retrieval circuit 28, where the data link 30 can be a hardware-based circuit connection or a shared memory location in a tangible computable readable storage medium that can be accessed during execution of operations related to the media player circuit 26 and/or the data retrieval circuit 28. Hence, the video presentation device 20 can implement the video outputs 32a and 32b as distinct windows 34a and 34b within an integrated display generated by the video presentation device 20.

The media player circuit 26 is configured for receiving an addressable video stream, for example based on reading the addressable media stream from a tangible storage medium 36, and/or receiving the addressable media stream from a media server 22a via the data network 24. The media player circuit 26 also can be configured for receiving user selection inputs, for example user navigation inputs for selecting one of multiple available addressable video streams via a video guide. The media player circuit 26 also can be configured for outputting to the data retrieval circuit 28, via the data link 30, video information 38 that describes the addressable video stream selected for viewing by the user 5 of the video presentation device 20. In particular, the video information 38 can include a content identifier 38a that uniquely identifies the addressable video stream, and a presentation timecode 38b that identifies a relative position of the addressable video stream that is currently being presented to the user 5 via the display device 18.

In response to receiving the content identifier 38a, the data retrieval circuit 28 can identify the addressable video stream that is selected for viewing by the user 5 of the video presentation device 20. Hence, the data retrieval circuit 28 can obtain geographic metadata 40 for the addressable video stream 16 that identifies geographic locations describing identifiable events within the addressable media stream. The data retrieval circuit 28 can obtain the geographic metadata 40 either from embedded metadata within the addressable video stream 16, or based on retrieving the geographic metadata 40 from a server 22b configured for providing metadata in response to a request 42 generated by the data retrieval circuit 28.

The geographic metadata 40 obtained from the metadata server 22b by the data retrieval circuit 28 can include the content identifier 38a that identifies the corresponding addressable video stream 16, or a query reference (not shown) that was specified in the query 42 and that enables the data retrieval circuit 28 to associate the geographic metadata 40 with the query 42. The geographic metadata 40 also includes at least one location metadata element 46 identifying a geographic location that describes a corresponding identifiable event within the addressable video stream 16. The geographic metadata 40 also can include at least one timecode element 44 identifying the corresponding identifiable event 14 associated with the location metadata element 46 in the geographic metadata 40: note that if the query 42 also specifies one or more timecode elements 44, then the metadata server 22b need not necessarily include the timecode element 44 with the geographic metatadata 40, since the data retrieval circuit 28 can determine relevant timecode elements 44 based on associating the query 42 together with the corresponding response 40. Hence, the addressable video stream 16 is composed as a sequence of identifiable events 14, wherein each identifiable event 14 can be identified by a corresponding timecode within the addressable media stream and have assigned a corresponding location metadata element 46 that identifies a geographic location describing the corresponding event 14.

Each geographic location can be identified by its corresponding location metadata element 46. The data retrieval circuit 28 can retrieve the relevant location information 12 for a geographic location based on sending a request 48 specifying the corresponding location metadata element 46. The request 48 can be sent by the data retrieval circuit 28 to a prescribed destination such as a database server 22c (e.g., a Google Earth server or a web-based map database server). Hence, the data retrieval circuit 28 can cause the retrieved location information 12 for a given event 14 to be displayed at a time instance coinciding with the presentation timecode 38b identifying that the corresponding event 14 is being displayed to the user 5. Hence, the concurrent presentation to the user 5 of the identifiable event 14 and the corresponding location information 12 about the geographic location describing the identifiable event 14 provides a geographic context 13 for the identifiable event 14.

Figure 2:
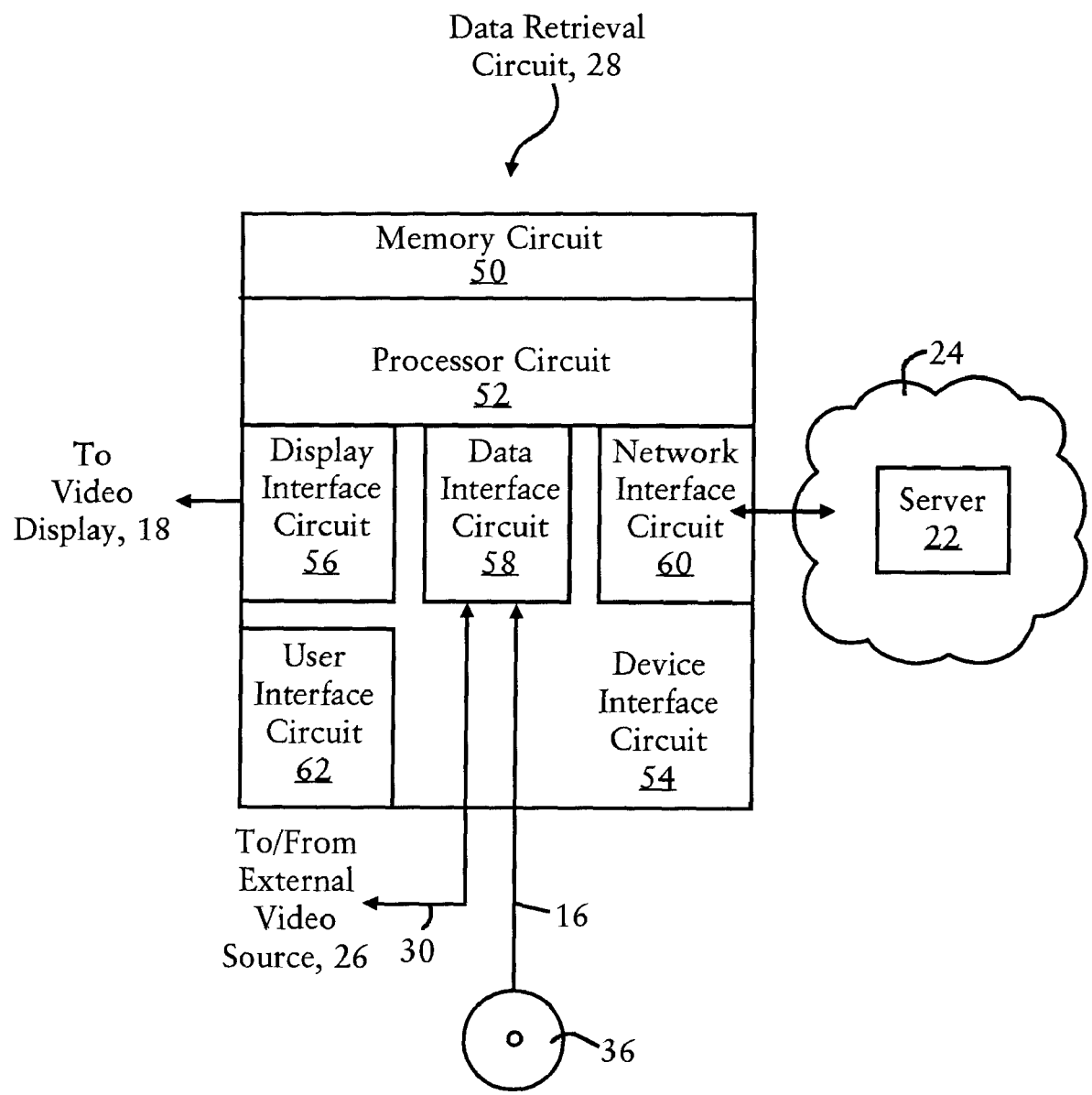
FIG. 2 illustrates in further detail the data retrieval circuit of FIG. 1, according to an example embodiment.

FIG. 2 illustrates an example data retrieval circuit 28, according to an example embodiment. The data retrieval circuit 28 can be configured for retrieving location information 12 for an addressable video stream 16 which can be presented to the user 5 via a distinct media player device, for example the media player circuit 26 of FIG. 1. Hence, the data retrieval circuit 28 can be configured for retrieving the location information 12 for events 14 within an addressable video stream 16 presented by an external video source 26, where synchronization between the data retrieval circuit 28 and the external video source 26 can be accomplished via a data link 30 based on the data retrieval circuit 28 receiving a presentation timecode 38b that identifies the relative position of the addressable video stream that is presented to the user 5.

The data retrieval circuit 28 also can be configured for including an internal media player circuit configured for receiving and presenting the addressable video stream to a video display device 18. Hence, the data retrieval circuit 28 can be configured for receiving the addressable video stream 16 from a remote source such as a media server 22 via a wide area network 24; the data retrieval circuit 28 also can be configured for receiving the addressable video stream 16 from a tangible computer readable storage medium, for example a DVD 36. Hence, the data retrieval circuit 28 can be configured for concurrently displaying an addressable video stream 16 and the associated location information 12 that provides geographic context 13 for the events in the addressable video stream.

The data retrieval circuit 28 includes a memory circuit 50, a processor circuit 52, and a device interface circuit 54. The device interface circuit 54 can include a display interface circuit 56 configured for outputting display information to an internal or external display device 18. The device interface circuit 54 also can include a data interface circuit 58, a network interface circuit 60, and a user interface circuit 62.

The data interface circuit 58 can be configured for sending and receiving data to and from local devices that are connected via a data link 30, for example via a serial data link (e.g., a Universal Serial Bus (USB)) or a parallel data link. The data interface circuit 58 also can be configured for interfacing with tangible media storage devices, for example an internal or external DVD player configured for reading a DVD 36 or a USB memory device (not shown).

The network interface circuit 60 can be configured for communications with a remote destination 22 via an open protocol local or wide area network 24, for example an Internet Protocol (IP) based network such as the Internet, or a video service provider network. The network interface circuit 60 can be configured as a wired or wireless Ethernet based transceiver (e.g., 100-Base T, IEEE 802.11g, etc.), or as a cable modem. Other access technologies also can be implemented within the network interface circuit 60.

The user interface circuit 62 can be configured for receiving user inputs either directly (e.g., from a keypad, touchpad, or joystick), or indirectly via a user control device such as a wireless remote control, a wired or wireless keyboard, and/or a wired or wireless mouse or other pointing device. Hence, the user interface circuit 62 can be configured for receiving user selection inputs, for example based on user navigation of an online video guide service, or DVD control inputs relative to a DVD 36 that is inserted for playback by the data retrieval circuit 28.

The processor circuit 52 can be configured for executing the operations described herein, including retrieving the addressable video stream 16 from the DVD 36, an external video source 26, or from a remote media server 22a, and obtaining geographic metadata 40 for the addressable video stream: the geographic metadata 40 can be either embedded within the addressable video stream 16 or the DVD 36, or retrieved from a destination (e.g., the metadata server 22b of FIG. 1) that is distinct from the source of the addressable video stream 16 (e.g., the DVD 36, the external video source 26, or the media server 22a). As described below, the processor circuit 52 also can be configured for retrieving location information 12 about the geographic locations identified in the geographic metadata 40, and generating and outputting display data for display of the location information 12 retrieved based on the geographic metadata 40. As described below, the location information 12 can be displayed by the processor circuit 52 to coincide with the identifiable event 14 of the addressable video stream 16, enabling the concurrent presentation of the location information 12 with the identifiable event 14 to provide a geographic context 13 for the identifiable event 14.

Figure 5:
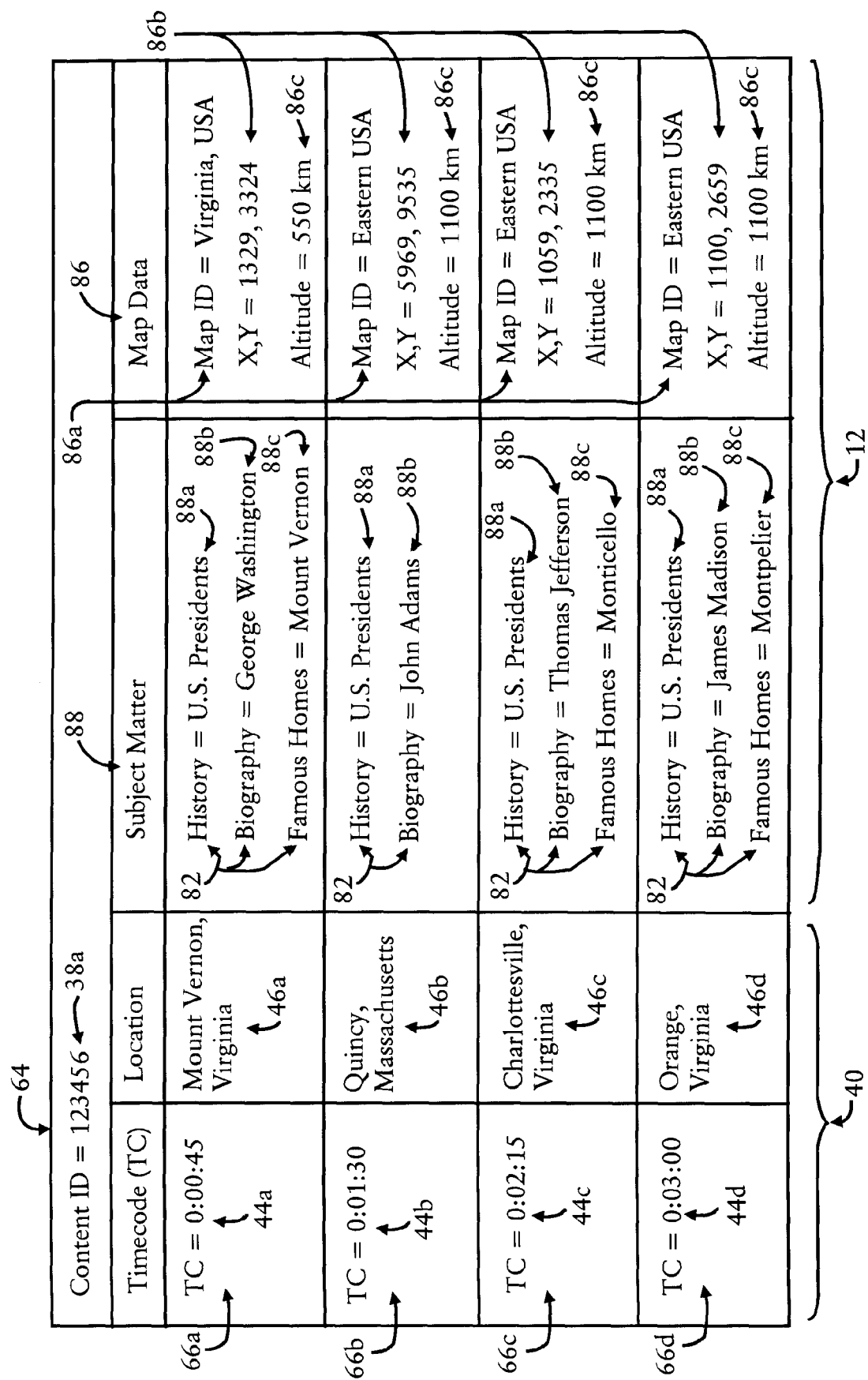
FIG. 5 illustrates an example data structure stored by the data retrieval circuit of FIG. 2 that includes geographic metadata for an addressable video stream, and location information retrieved based on the geographic metadata and that provides a geographic context for events within the addressable video stream, according to an example embodiment.

The memory circuit 50 can be configured for buffering the addressable video stream received by the data retrieval circuit 28 prior to output to the video display 18. The memory circuit 50 also can be configured for storing data structures constructed by the processor circuit 52, including metadata structures such as metadata files or metadata elements described herein such as the content identifier 38a, the geographic metadata 40 for one or more events 14, and the location information 12 for one or more geographic locations identified by the geographic metadata 40. An example data structure 64 that can be generated by the processor circuit 52 and stored in the memory circuit 50 is illustrated in FIG. 5 and described below.

Any of the disclosed circuits of the media player circuit 26 and/or the data retrieval circuit 28 (including the device interface circuit 54, the memory circuit 50, and processor circuit 52, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 50) causes the processor circuit 52 to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 50 can be implemented, for example, using a non-volatile memory such as a programmable read only memory (PROM) or an EPROM, and/or a volatile memory such as a DRAM, etc.

Further, any reference to "outputting a message", "outputting a packet", "outputting a request", "outputting data", or "outputting a query" (or the like) can be implemented based on creating the message/packet in the form of a data structure and storing that data structure in a tangible memory medium in the disclosed apparatus (e.g., in a transmit buffer). Any reference to "outputting a message", "outputting a packet", "outputting a request", "outputting data", or "outputting a query" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message", "receiving a packet", "receiving a request", "receiving data", or "receiving a query" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 50 can be implemented dynamically by the processor circuit 52, for example based on memory address assignment and partitioning executed by the processor circuit 52.

Figure 3:
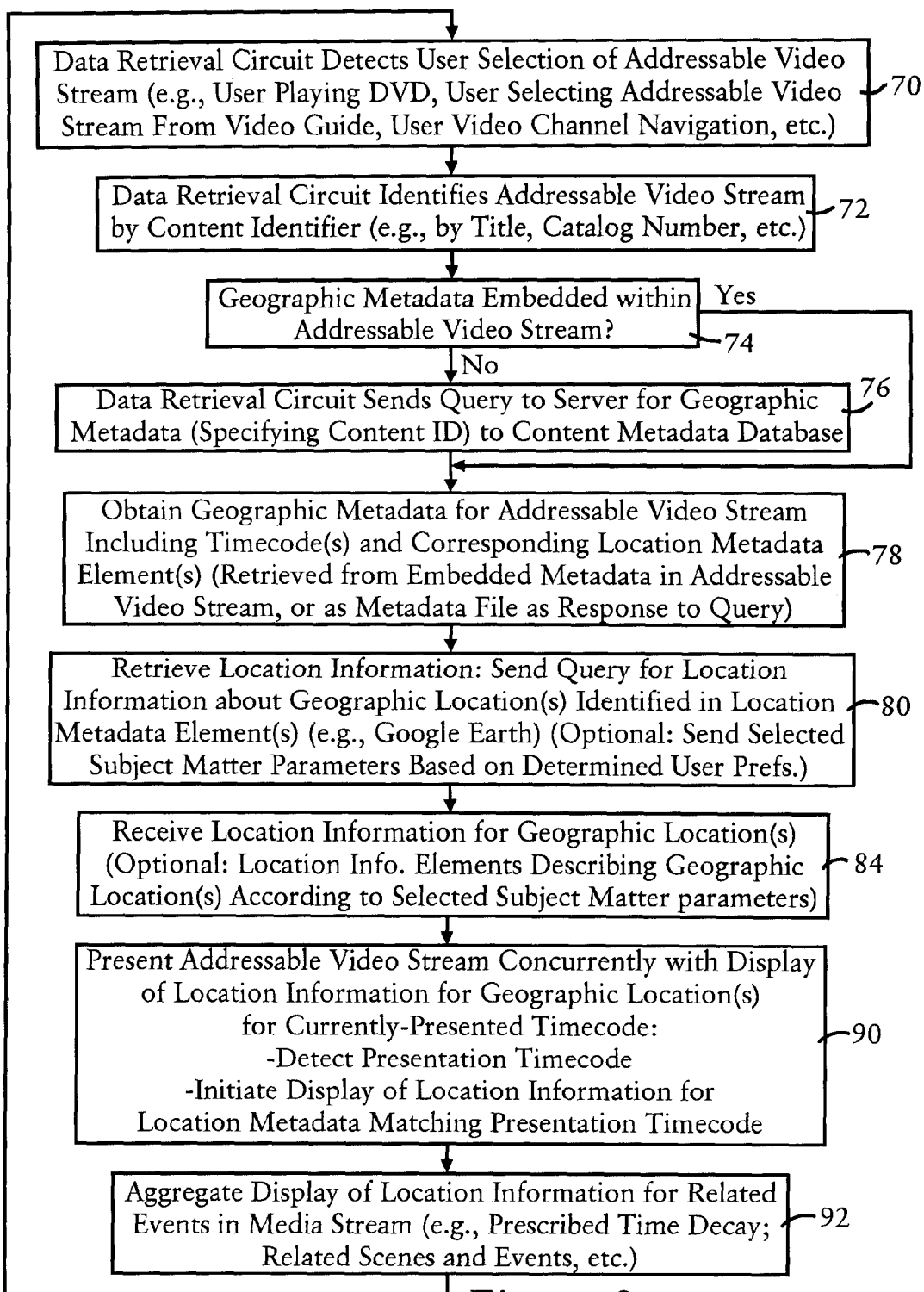
FIG. 3 illustrates an example method by the data retrieval circuit of FIG. 2 of retrieving and presenting location information that provides a geographic content for an event presented in an addressable video stream, according to an example embodiment.

FIG. 3 illustrates an example method by the data retrieval circuit 28 of FIGS. 1 and 2, according to an example embodiment. The steps described in FIG. 3 can be implemented as executable code stored on a computer readable medium (e.g., floppy disk, hard disk, ROM, EEPROM, nonvolatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

As illustrated in FIG. 3, the processor circuit 52 of the data retrieval circuit 28 can detect in step 70 via the device interface circuit 54 that a user 5 of the data retrieval circuit 28 is selecting an addressable video stream 16 for viewing. For example, the user interface circuit 62 can detect a user selection input in the form of a user navigational input requesting selection of a prescribed video channel from a video guide or video channel navigation; the data interface circuit 58 can detect the insertion of a DVD 36 by the user 5; the network interface circuit 60 can detect an incoming addressable video stream 16 supplied from a remote media source such as a media server 22. The data interface circuit 58 also can detect video information 38 received from the external video source 26 via the data link 30 and specifying a content identifier 38a for an addressable video stream selected for viewing by the user 5 of the external video source 26 and the data retrieval circuit 28.

The processor circuit 52 of the data retrieval circuit 28 can interpret in step 72 the user selection input detected by the device interface circuit 54 and identify the addressable video stream 16. For example, the processor circuit 52 can identify the addressable video stream 16 based on a corresponding unique content identifier 38a that uniquely identifies the addressable video stream 16: as described with respect to step 70, the unique content identifier 38a can be obtained from various sources depending on the manner in which the addressable video stream 16 is supplied to the user 5 (e.g., DVD identifier, network-assigned content identifier, etc.).

The processor circuit 52 of the data retrieval circuit 28 can obtain geographic metadata 40 for the addressable video stream 16 in response to identifying the addressable video stream. For example, if in step 74 the processor circuit 52 of the data retrieval circuit 28 determines that geographic metadata is not embedded within the addressable video stream identified in step 72, the processor circuit 52 of the data retrieval circuit 28 can generate and send in step 76 a query 42 to a content metadata server 22b (illustrated in FIG. 1). The query 42 specifies the content identifier 38a uniquely identifying the addressable video stream 16, enabling the content metadata server 22 to supply the relevant geographic metadata 40 for the addressable video stream 16 identified by the content identifier 38a. The processor circuit 52 of the data retrieval circuit 28 can obtain in step 78 the geographic metadata 40 for the addressable video stream 16, either from embedded metadata within the addressable media stream 16, or from receiving a response from the content metadata server 22b, and store the obtained geographic metadata 40 in the memory circuit 50 of the data retrieval circuit 50 (or another memory circuit accessible by the processor circuit 52, for example a networked disk drive). As illustrated in FIGS. 1 and 5, the geographic metadata 40 obtained by the processor circuit 52 can include the content identifier 38a, one or more timecode elements 44, and one or more corresponding location metadata elements 46.

Each timecode element 44 identifies a corresponding identifiable event 14 within the addressable video stream 16, where the corresponding value of the timecode element 44 identifies the relative position within the addressable media stream 16 that the corresponding event 14 is presented to the user 5. Each identifiable event 14, identified by its corresponding timecode element 44, has an associated location metadata element 46, illustrated in FIG. 5, that identifies a geographic location describing the corresponding identifiable event 14.

As illustrated in FIG. 5, the processor circuit 52 can store in the memory circuit 50 a data structure 64 that includes a sequence of geographic context metadata entries 66 for a selected addressable video stream 16 (identified by its content identifier 38a). The sequence of geographic context metadata entries 66 store metadata for providing a geographic context 13 for respective successive events 14 presented within the addressable video stream 16 and identifiable by the respective timecode elements 44. Hence, the geographic context metadata entry 66a illustrates a location metadata element ("Location=Mount Vernon, Virginia") 46a identifying a geographic location that describes an event 14 in the addressable video stream 16 starting at timecode (TC=0:00:45) 44a. Similarly, the geographic context metadata entry 66b illustrates a location metadata element ("Location=Quincy, Massachusetts") identifying a geographic location that describes an event 14 in the addressable video stream 16 starting at timecode (TC =0:01:30) 44*b*. The geographic context metadata entries 66*c* and 66*d* further illustrate respective location metadata elements 46*c* and 46*d* identifying respective geographic locations describing events in the addressable video stream 16 starting at the respective timecodes specified by the respective timecode elements 44*c* and 44*d*.

In response to retrieving the geographic metadata 40 in step 78, the processor circuit 52 in the data retrieval circuit 28 can create at least one new geographic context metadata entry 66 for storage of the geographic metadata 40 containing the corresponding timecode element 44 and the corresponding location metadata element 46. If the geographic metadata 40 obtained by the processor circuit 52 is for a new addressable video stream, the processor circuit 52 can add the new geographic context metadata entry 66 to a new data structure 64 specifying the corresponding content identifier 38*a* for the new addressable video stream; if a data structure 64 specifying the corresponding content identifier 38*a* already exists for the addressable video stream identified instep 72, the new geographic context metadata entry 66 is added to the existing data structure 64.

Hence, the processor circuit 52 can accumulate geographic context metadata entries 66 storing at least the geographic metadata 40 for respective events 14 viewed by the user 5, based on storing the geographic context metadata entries 66 in one or more data structures 64, for example within the memory circuit 50.

Figure 4:
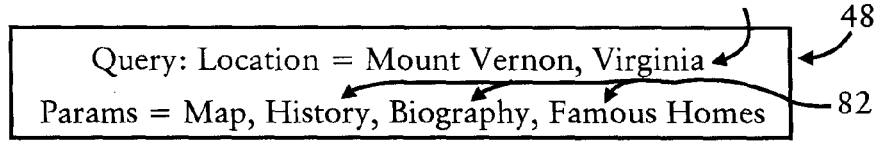
FIG. 4 illustrates an example query for location information output by the data retrieval circuit of FIG. 2, according to an example embodiment.

The processor circuit 52 can retrieve location information 12 for each location metadata element 46 stored in a corresponding geographic context metadata entry 66 in response to reception thereof, enabling the concurrent display of the identifiable event 14 with the corresponding geographic context 13. For example, the processor circuit 52 can retrieve in step 80 the location information 12 for the geographic location(s) specified in the geographic metadata 40, for example based on sending a request or query 48 for the location information about at least one geographic location specified by a location metadata element 46. FIG. 4 illustrates an example request 48 generated via the processor circuit 52 in step 80 and output by the network interface circuit 60 to a prescribed destination, for example the database server 22*c*. The database server 22*c* can be implemented, for example, as a web-based database server or any remote storage device configured for supplying location information. One example implementation of the server 22*c* can be a Google Earth server.

As illustrated in FIG. 4, the request 48 can specify the geographic location in the form of the relevant location metadata element 46*a*. The request 48 also can specify subject matter parameters 82 for identification of relevant subjects associated with the geographic location identified by the location metadata element 46*a*.

The processor circuit 52 can select in step 80 the subject matter parameters 82 to be submitted in the request 48 based on determined user preferences: the user preferences can be determined by the processor circuit 52 from static user preference information, for example a stored list of user interests; alternatively, the user preferences can be determined by the processor circuit 52 dynamically based on detected user actions. An example of dynamically determining user preferences is disclosed in commonly-assigned, copending U.S. patent application Ser. No. 11/947,298, filed Nov. 29, 2007, entitled "Socially Collaborative Filtering". In summary, user selection preferences of an identified user 5 can be identified by the processor circuit 52 based on an accumulation of user selection inputs executed by the identified user 5 relative to input options presented to the user 5 and identifying respective available network items. The accumulation of user selection inputs includes an identification of the input options not having been selected by the identified user 5. The processor circuit 52 (or a remote server reachable via the network 22) can determine a group of network users having a highest correlation of shared interests with the identified user 5: the group of network users having the highest correlation of shared interests with the identified user 5 is based on identifying preferred network items for the identified user 5, and identifying first network users providing highest relative user affinity values for each of the preferred network items. Hence, the processor circuit 52 can determine a user preference in the form of at least one network item most likely to be preferred by the identified user 5, based on determining, from among network items not presented to the identifier user 5, the preferred network items for each of the first network users in the group.

Another example of a selected subject matter parameter that can be submitted in the request 48 is user comments submitted by users that have previously viewed the addressable video stream 16. Hence, the request 48 also can include a "user comments" as a subject matter parameter 82 for retrieval of comments by other users with respect to an event 14 identified by its corresponding timecode. The association of user comments with an event in an addressable video stream is described in further detail in commonly-assigned, copending U.S. patent application Ser. No. 12/110,238, filed Apr. 25, 2008, entitled "Associating User Comments to Events Presented in a Media Stream".

The request 48 generated and output by the processor circuit 52 of the data retrieval circuit 28 can include one or more geographic locations 46 specified within the request. Hence, the processor circuit 52 of the data retrieval circuit 28 can receive and store in step 84 location information 12 from the server 22*a* for each geographic location 46 specified in the request 48. The processor circuit 52 of the retrieval circuit 28 can store the received location information 12 within the appropriate geographic context metadata entry 66 of the data structure 64 illustrated in FIG. 5. If the request 48 included any subject matter parameters 82, the location information 12 returned by the server 22 can include the location information elements 12 according to the respective subject matter parameters 82.

As illustrated in FIG. 5, the location information elements 12 received from the server 22 and stored by the processor circuit 52 of the data retrieval circuit 28 can include map elements 86 for displaying the geographic context for the respective events 14. The map elements 86 can include a map identifier element 86*a*, a map coordinate element 86*b* for positioning a "pointer" location within the identified map, and a map altitude element 86*c* identifying a recommended map zoom or scale factor.

The location information elements 12 also can include subject matter elements 88 that include subject matter metadata describing a geographic location according to prescribed subject matter parameters. For example, a given location metadata element 46 (e.g., 46*a*) for a given geographic location can have an associated subject matter element (e.g., "History=U.S. Presidents") 88*a* describing a historical significance of the corresponding geographic location; a given location metadata element 46 (e.g., 46*a*) also can have an associated subject matter element (e.g., "Biography=George Washington") 88*b* identifying an individual having biographical significance to the corresponding geographic location; a given location metadata element 46 (e.g., 46*a*) also can have an associated subject matter element (e.g., "Famous Homes=Mount Vernon") 88c identifying a famous building or home located at the corresponding geographic location.

Hence, the association of the location metadata element 46 (identifying a geographic location that describes the corresponding identifiable event 14 at the corresponding timecode 44) with subject matter elements 88 can provide both geographic context for the identifiable event, and additional context dimensions relative to the geographic location. The subject matter context may be related to the events within the addressable media stream 16, or may be distinct based on user preferences or interests. In addition, the processor circuit 52 within the data retrieval circuit 28 can implement filtering in order to limit the information that is to be displayed to the user 5.

In response to retrieving the location information 12 for at least one of the events 14 in the addressable video stream 16 (identified by its corresponding timecode element 44), the processor circuit 52 of the data retrieval circuit 28 can output the location information 12 (according to the appropriate display format) in step 90 to the device interface circuit 54 for display of the location information 12 with the corresponding event 14. In particular, the processor circuit 52 can detect in step 90 a presentation timecode 38b identifying that the corresponding event 14 is being displayed to the user 5, either based on detecting the timecode 38b from a data link 30 if the addressable video stream 16 is presented by an external video source 26, or by the processor circuit 52 detecting the presentation timecode 38b by maintaining control of local presentation of the addressable video stream 16 (e.g., based on a received media stream from a local DVD 36 or a media server 22).

The processor circuit 52 can determine whether the presentation timecode (e.g., 38b) coincides with a timecode element 44 identifying a corresponding event 14 based on determining whether the value of the presentation timecode equals the value of the timecode element 44. In response to the processor circuit 52 detecting that the presentation timecode (e.g., 38b) indicates that the relative position of the addressable video stream 16 currently presented to the user 5 coincides with one of the timecode elements 44 (e.g., 44a) specified in the geographic metadata 40, the processor circuit 52 can initiate the displaying of the corresponding location information 12 (e.g., the location information elements associated with the geographic context metadata entry 66a), concurrent with presentation of the corresponding event 14. Hence, the concurrent display of the event 14 with the corresponding location information 12 provides the geographic context 13 for the identifiable event 14. Although not illustrated in FIG. 5, the metadata associated with a given event 14 also can include a duration identifier that specifies the duration of the event, for example a particular scene within the addressable media stream 14.

The processor circuit 52 can repeat step 90 for each geographic context metadata entry 66 as the presentation timecode (e.g., 38b) advances to the next corresponding timecode element 44. In addition, the processor circuit 52 can repeat any of the steps 78, 80, or 84 for retrieval of geographic metadata 40 or location information 12 related to events 14 within the addressable video stream 16 that have not yet been presented to the user 5.

Figure 6A:
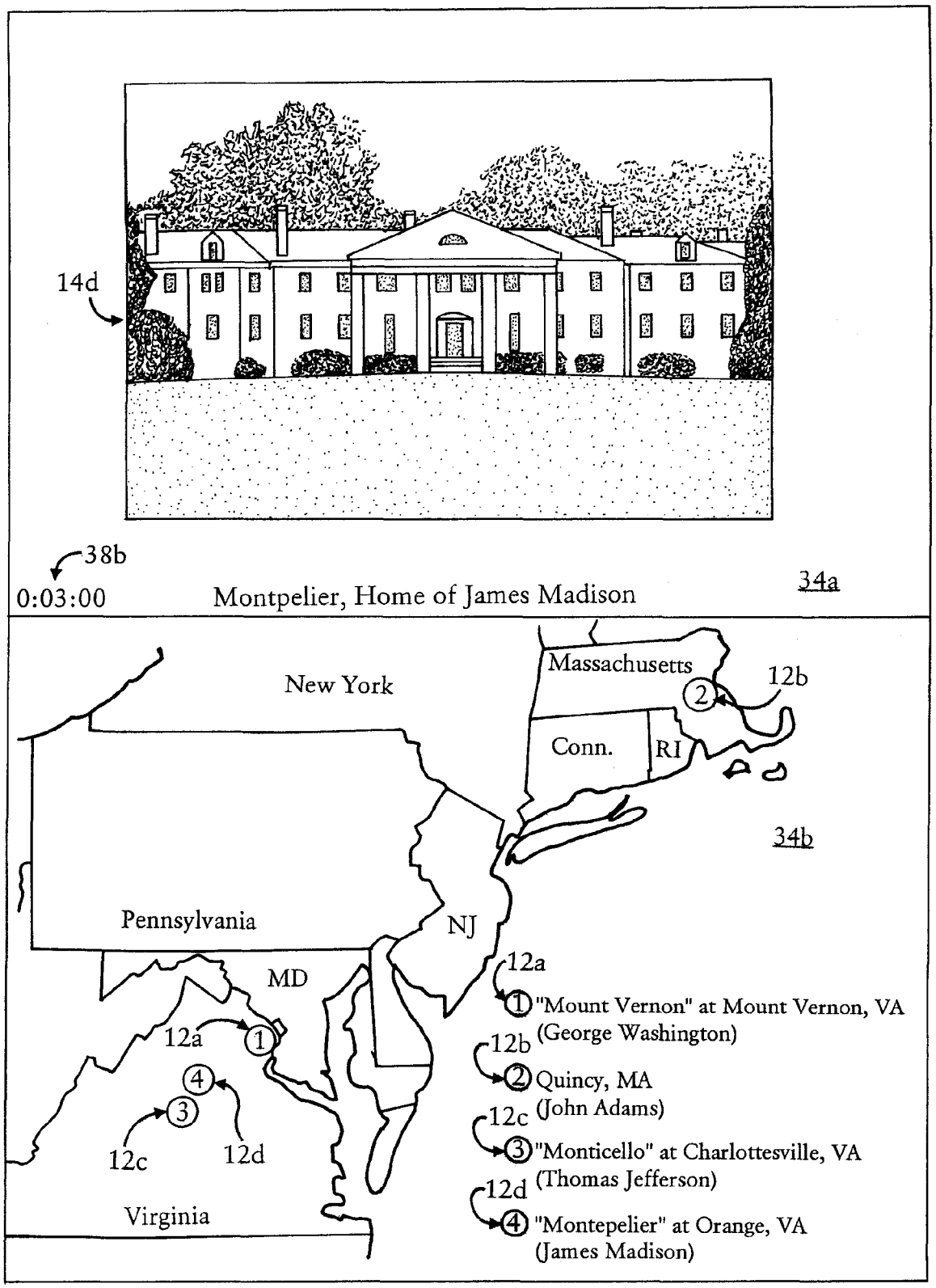
FIGS. 6A and 6B illustrate example displays output by the data retrieval circuit of FIG. 2, for presentation of an identifiable event of an addressable video stream with geographic context for the identifiable event, according to an example embodiment.

As described previously, the processor circuit 52 can aggregate in step 92 the display of the location information elements from respective geographic context metadata entries 66, enabling the location information 12 for a first event 14 identified by its corresponding timecode element (e.g., 44a) to be aggregated with the location information 12 for respective successive identifiable events 14 identified by their respective timecodes (e.g., 44b, 44c, and 44d) and presented subsequent to the first timecode element (e.g., 44a). As illustrated in FIG. 6A, the processor circuit 52 can aggregate the concurrent display of the location information 12a, 12b, 12c, 12d associated with the respective geographic context metadata entries 66a, 66b, 66c, and 66d based on determining a relationship between the respective location information 12a, 12b, 12c, and 12d relative to a prescribed attribute, for example one of the subject matter attributes 88. As illustrated in FIG. 5, each of the events associated with the respective geographic context metadata entries 66a, 66b, 66c and 66d share the common subject matter attribute 88a of "History=U.S. Presidents". Hence, the processor circuit 52 can aggregate the display in FIG. 6A within the display 34b of the location information for respective timecodes based on determined relationships between the respective events 14, even as a later event 14d is displayed as indicated by the presentation timecode 38b.

Figure 6B:
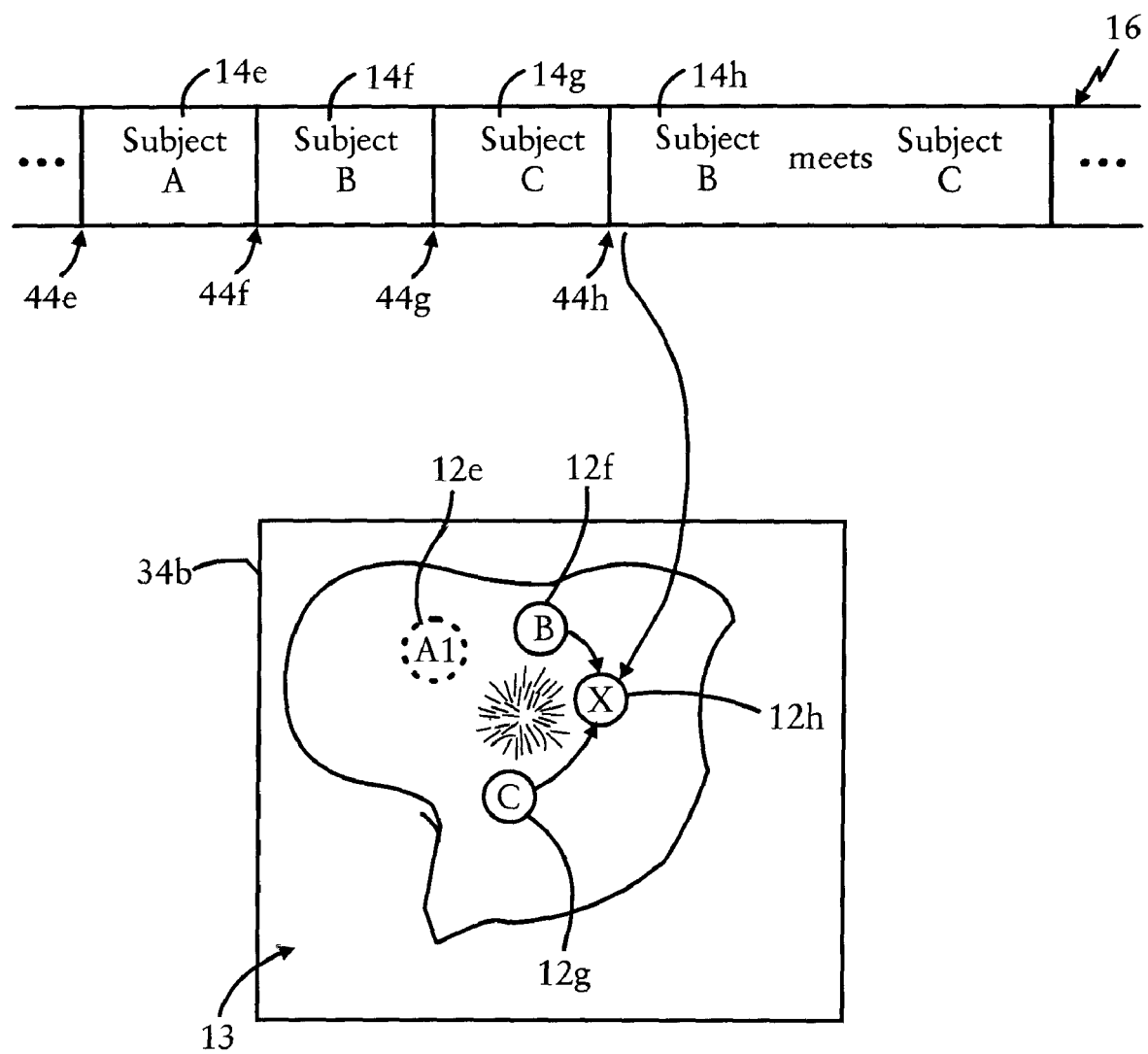

FIG. 6B illustrates another example of presenting location information 12e, 12f, 12g, and 12h for respective succeeding events 14e, 14f, 14g, and 14h, including aggregating location information 12f, 12g, and 12h based on determined relationships between the respective events 14f, 14g, and 14h. In particular, the processor circuit 52 can determine in step 92 of FIG. 3 from the associated subject matter elements 88 that the event 14e is not related to any of the subsequent events 14f, 14g, or 14h; consequently, the processor circuit 52 can remove the display of the location information 12e after a prescribed interval or according to a prescribed decay function (e.g., removing the display of the location 12e before event 14g), illustrated by the location information 12e as a dotted circle. In contrast, the processor circuit 52 can aggregate the concurrent display of the location information 12f, 12g, and 12h (illustrating, for example, movement by different subjects B, C within the addressable video stream 16 at the respective events), providing an enhanced geographical context 13 of the geographical relationship and geographical interaction between different subjects (B, C) within the addressable video stream 16.

The processor circuit 52 also can aggregate the display of the location information 12e, 12f, 12g, and 12h for the respective events 14e, 14f, 14g, and 14h distinct from the presentation of the events 14e, 14f, 14g, and 14h in the addressable media stream 16. For example, a user 5 can set an option via the user interface circuit 62 that disables the concurrent presentation of the event 14 with the corresponding geographic context 13 (e.g., disabling step 90 of FIG. 3): in this case, the processor circuit 52 can be configured displaying in step 92 the aggregated display as illustrated in FIG. 6B in response to a user selection to review the aggregated display 34 of FIG. 6B independent of the presentation of the addressable video stream 16. Hence, assuming a user 5 views three distinct addressable media streams 16 during the course of an hour over a given morning, the processor circuit 52 can store and accumulate the geographic metadata 40 in step 78 for the respective events 14 of the addressable media streams 16 in three respectively distinct data structures 64. Steps 80, 84, and 92 of FIG. 3 can be deferred until the user 5 inputs a selection to view the location information 12: hence, the relevant location information 12 for the respective events 14 need not be retrieved by the processor circuit 52 in this example until the user inputs a selection to view the aggregated display 34b illustrated in FIG. 6B, for example on another day following the morning that the user viewed the three distinct addressable media streams 16.

Hence, a user can view the geographic context 13 based on viewing the aggregated location information 12e, 12f, 12g, 12g (aggregated over multiple events 14e, 14f, 14g, 14h, etc.) at a time distinct from the viewing of the events 14. In this example, the viewing of the geographical context 13 can be based on the processor circuit 52 of the data retrieval circuit 28 automatically retrieving the geographic metadata 40 in response to the identifying the addressable video stream(s) 16, and the processor circuit 52 retrieving the location information 12 either in response to detecting obtaining the location metadata elements 46, or in response to detecting a user request for display of the location metadata elements 46, for example as part of the user 5 requesting to view his or her "viewing profile". The processor circuit 52 can present the "viewing profile" as a list of viewed shows (e.g., within a user-selected time interval) with the relevant location information aggregated and displayed to the user. Hence, users can enjoy a persistent, dynamically-aggregated list of location information related to viewing in order to better understand viewing habits.

According to the example embodiments, geographic context information can be automatically retrieved for identifiable events or scenes within an addressable video stream, without the necessity of any user action with respect to obtaining the geographic context information. The geographic context information can be stored and aggregated for viewing by the user at a later time distinct from the time the user views the identifiable events within the addressable video stream. The geographic context information also can be concurrently displayed with the identifiable events, providing an enhanced user experience. The concurrent presentation of the addressable video stream to the user can be distinct from the display of the location information providing the geographic context for the events within the addressable video stream, so long as some means of synchronization can be accomplished between the presentation of the addressable video stream and the display of the location information to ensure the concurrent presentation of the identifiable events and the associated location information providing the geographic context.

As used herein, a "geographic location" or "geographic context" is not necessarily limited to relying on geographic coordinates on the Earth; to the contrary, a "geographic location" or "geographic context" as used herein can be based on a prescribed coordinate system of real locations extending beyond the Earth, for example two-dimensional or three-dimensional coordinate systems used for positioning celestial objects (e.g., planets, stars, galaxies, etc.). A "geographic location" or "geographic context" as used herein also can be based on a prescribed coordinate system or a prescribed coordinate space, where the prescribed coordinate space can be referenced to a real space, a fictional space, or a virtualized space. A "real space" is based on referencing a physical construct, for example a terrestrial space, a celestial space, a political space (e.g., city, state, country) or a legal space (e.g., real property). A "fictional space" is based on referencing a fictional location, for example a fictional land or fictional regions (in the case of fantasy or science fiction). A "virtualized space" is based on referencing a space that does not exist, but can be based on real elements, for example a virtualized house (having parameters stored in a computer-readable tangible memory medium) that can be presented by a microprocessor-based computer: the virtualized house is constructed based on the computer assembling images of rooms from different real houses. Hence, the virtualized space can based on a microprocessor-based computer constructing (and/or retrieving from a computer-readable tangible memory medium) and displaying the virtualized space. Consequently, geographic locations within a virtualized space can be presented to a user as the user views an addressable video stream having events related to the virtualized space. Also note that multiple coordinate spaces can be used for the same addressable video stream.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
identifying, by a device, a plurality of distinct addressable video streams selected for viewing by a user of the device;
automatically obtaining, by the device and without any user action, geographic metadata for each of the addressable video streams in response to the device identifying the addressable video streams selected for viewing by the user, the geographic metadata including, for each addressable video stream, a location metadata element identifying a geographic location that describes a corresponding identifiable event within the corresponding addressable video stream;
retrieving, by the device, location information about the geographic locations based on the respective location metadata elements; and
aggregating by the device the location information for the identifiable events of the addressable video streams into an aggregated display for display to the user, the aggregated display providing a geographic context for a viewing profile of the user, the viewing profile of the user related to viewing habits of the user having viewed the identifiable events of the addressable video streams, wherein:
the geographic metadata includes a second location metadata element identifying a second geographic location that describes a corresponding second identifiable event within one of the addressable video streams;
the retrieving including retrieving second location information about the second geographic location in response to detecting the corresponding location metadata element;
the displaying including displaying the second location information to the user for concurrent presentation to the user of the second identifiable event and the second location information that provides the geographic context for the second identifiable event, wherein the location information and the second location information are selectively concurrently displayed with the second identifiable event based on whether the device detects a relationship between the location information and the second location information.

2. The method of claim 1, wherein the obtaining includes initiating retrieval of the geographic metadata in response to a selection by the user to view the corresponding addressable video stream.

3. The method of claim 2, wherein the obtaining includes retrieving the geographic metadata from any one of embedded metadata within the corresponding addressable video stream, or a destination that is distinct from a source of the corresponding addressable video stream.

4. The method of claim 1, wherein the displaying includes detecting a presentation timecode identifying a relative position of one of the addressable video streams that is currently presented to the user; and initiating the displaying of the location information in response to detecting that the presentation timecode coincides with a timecode identifying the identifiable event, for concurrent presentation to the user of the identifiable event and the location information that provides the geographic context for the identifiable event.

5. The method of claim 1, wherein the retrieving includes:
sending a request to a prescribed destination for the location information about the geographic location, the request specifying the geographic location and subject matter parameters, the subject matter parameters selected by the device based on determined user preferences; and
receiving from the prescribed destination a plurality of location information elements describing the geographic location according to the respective subject matter parameters.

6. The method of claim 1, wherein at least one of the location information or the second location information includes subject matter elements identifying respective subjects within the at least one of the identifiable event or the second identifiable event, the displaying including selecting the location information and the second location information for concurrent display based on a determined relationship between at least one of the subject matter elements of the identifiable event and the second identifiable event.

7. The method of claim 1, further comprising the device receiving one of the addressable video streams, the displaying including concurrently presenting the one addressable video stream and the location information to a display device.

8. An apparatus comprising:
a device interface circuit configured for detecting selection of a plurality of addressable video streams selected for viewing by a user of the apparatus; and
a processor circuit configured for identifying each of the addressable video streams selected by the user, the processor circuit further configured for automatically obtaining, without any user action, geographic metadata for each of the addressable video streams in response to identifying the corresponding addressable video stream selected for viewing by the user, the geographic metadata including a location metadata element identifying a geographic location that describes a corresponding identifiable event within the corresponding addressable video stream; the processor circuit further configured for retrieving location information about the geographic locations based on the respective location metadata elements;
the processor circuit further configured for aggregating the location information for the identifiable events of the addressable video streams into an aggregated display for display by the device interface circuit to the user, the aggregated display providing a geographic context for a viewing profile of the user, the viewing profile of the user related to viewing habits of the user having viewed the identifiable events of the addressable video streams, wherein:
the geographic metadata includes a second location metadata element identifying a second geographic location that describes a corresponding second identifiable event within one of the addressable video streams;
the processor circuit configured for retrieving second location information about the second geographic location in response to detecting the corresponding location metadata element;
the processor circuit further configured for displaying the second location information to the user for concurrent presentation to the user of the second identifiable event and the second location information that provides the geographic context for the second identifiable event, wherein the location information and the second location information are selectively concurrently displayed with the second identifiable event based on the processor circuit determining whether the device detects a relationship between the location information and the second location information.

9. The apparatus of claim 8, wherein the processor circuit is configured for initiating retrieval of the geographic metadata in response to a selection by the user to view the corresponding addressable video stream.

10. The apparatus of claim 9, wherein the processor circuit is configured for retrieving the geographic metadata from any one of embedded metadata within the corresponding addressable video stream, or a destination that is distinct from a source of the corresponding addressable video stream.

11. The apparatus of claim 8, wherein the processor circuit is configured for detecting a presentation timecode identifying a relative position of one of the addressable video streams that is currently presented to the user; and initiating the displaying of the location information in response to detecting that the presentation timecode coincides with a timecode identifying the identifiable event, for concurrent presentation to the user of the identifiable event and the location information that provides the geographic context for the identifiable event.

12. The apparatus of claim 8, wherein:
the processor circuit is configured for sending a request to a prescribed destination for the location information about the geographic location, the request specifying the geographic location and subject matter parameters, the subject matter parameters selected by the device based on determined user preferences;
the processor circuit is configured for receiving from the prescribed destination a plurality of location information elements describing the geographic location according to the respective subject matter parameters.

13. The apparatus of claim 8, wherein at least one of the location information or the second location information includes subject matter elements identifying respective subjects within the at least one of the identifiable event or the second identifiable event, the processor circuit configured for selecting the location information and the second location information for concurrent display based on a determined relationship between at least one of the subject matter elements of the identifiable event and the second identifiable event.

14. The apparatus of claim 8, wherein the device interface circuit is configured for receiving one of the addressable video streams, the processor circuit configured for concurrently presenting the one addressable video stream and the location information to a display device.

15. An apparatus comprising:
means for detecting selection of a plurality of distinct addressable video streams selected for viewing by a user of the apparatus; and
means for identifying each of the addressable video streams selected by the user, the means for identifying further configured for automatically obtaining, without any user action, geographic metadata for each of the addressable video streams in response to identifying the corresponding addressable video stream selected for viewing by the user, the geographic metadata including a location metadata element identifying a geographic location that describes a corresponding identifiable event within the corresponding addressable video stream;

the means for identifying further configured for retrieving location information about the geographic locations based on the respective location metadata elements;

the means for identifying further configured for aggregating the location information for the identifiable events of the addressable video streams into an aggregated display for display by the means for detecting to the user, the aggregated display providing a geographic context for a viewing profile of the user, the viewing profile of the user related to viewing habits of the user having viewed the identifiable events of the addressable video streams, wherein:

the geographic metadata includes a second location metadata element identifying a second geographic location that describes a corresponding second identifiable event within one of the addressable video streams;

the means for identifying configured for retrieving second location information about the second geographic location in response to detecting the corresponding location metadata element;

the means for identifying further configured for displaying the second location information to the user for concurrent presentation to the user of the second identifiable event and the second location information that provides the geographic context for the second identifiable event, wherein the location information and the second location information are selectively concurrently displayed with the second identifiable event based on the means for identifying determining whether the device detects a relationship between the location information and the second location information.

16. Logic encoded in one or more non-transitory computer-readable media for execution and when executed operable for:

identifying, by a device, a plurality of distinct addressable video streams selected for viewing by a user of the device;

automatically obtaining, by the device and without any user action, geographic metadata for each of the addressable video streams in response to the device identifying the addressable video streams selected for viewing by the user, the geographic metadata including, for each addressable video stream, a location metadata element identifying a geographic location that describes a corresponding identifiable event within the corresponding addressable video stream;

retrieving, by the device, location information about the geographic locations based on the respective location metadata elements; and aggregating by the device the location information for the identifiable events of the addressable video streams into an aggregated display for display to the user, the aggregated display providing a geographic context for a viewing profile of the user, the viewing profile of the user related to viewing habits of the user having viewed the identifiable events of the addressable video streams, wherein:

the geographic metadata includes a second location metadata element identifying a second geographic location that describes a corresponding second identifiable event within one of the addressable video streams;

the retrieving including retrieving second location information about the second geographic location in response to detecting the corresponding location metadata element;

the displaying including displaying the second location information to the user for concurrent presentation to the user of the second identifiable event and the second location information that provides the geographic context for the second identifiable event, wherein the location information and the second location information are selectively concurrently displayed with the second identifiable event based on whether the device detects a relationship between the location information and the second location information.

* * * * *